(12) United States Patent
Ludwig

(10) Patent No.: US 8,706,449 B2
(45) Date of Patent: Apr. 22, 2014

(54) ADVANCED SYNTHESIZED HYSTERESIS FOR SIGNAL PROCESSING, CONTROLLERS, MUSIC, AND COMPUTER SIMULATIONS IN PHYSICS, ENGINEERING, AND ECONOMICS

(75) Inventor: Lester F. Ludwig, San Antonio, TX (US)

(73) Assignee: Lester F. Ludwig, San Antonio, TX (US)

( * ) Notice: Subject to any disclaimer, the term of this patent is extended or adjusted under 35 U.S.C. 154(b) by 312 days.

(21) Appl. No.: 13/186,459

(22) Filed: Jul. 19, 2011

(65) Prior Publication Data

US 2012/0019307 A1 Jan. 26, 2012

Related U.S. Application Data

(60) Provisional application No. 61/365,785, filed on Jul. 20, 2010.

(51) Int. Cl.
*G05B 13/00* (2006.01)

(52) U.S. Cl.
USPC .......................................................... 702/189

(58) Field of Classification Search
USPC ......................................... 702/189; 327/407
See application file for complete search history.

(56) References Cited

U.S. PATENT DOCUMENTS 6,420,987 B1 * 7/2002 Schoner et al. ............... 341/143

FOREIGN PATENT DOCUMENTS

EP 184280 A1 * 6/1986 .............. H03F 3/217

* cited by examiner

*Primary Examiner* — Manuel L Barbee
(74) *Attorney, Agent, or Firm* — Procopio, Cory, Hargreaves & Savitch LLP

(57) ABSTRACT

A method for synthesis of a hysteresis function of a plurality of inputs is described. The method includes receiving and processing of a plurality of input signals with at least a parameterized multivariable nonlinearity, the parameterized multivariable nonlinearity serving as a parameterized hysteron, to produce at least one output signal. The plurality of input signals is also processed by at least a controller function, the controller function comprising memory and producing at least one control signal responsive to at least one of the plurality of input signals, the at least once control signal for controlling the parameterized hysteron. The at least one control signal is used to control the parameterized hysteron so as to create a hysteretic response to at least one of the plurality of input signals.

18 Claims, 16 Drawing Sheets

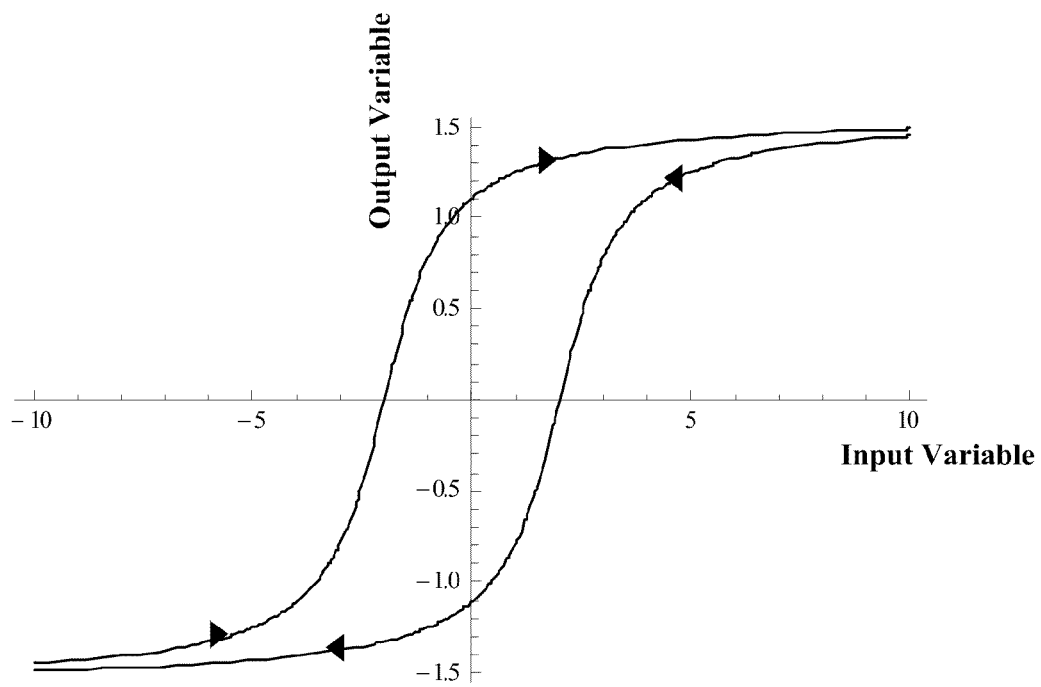
FIG. 1A
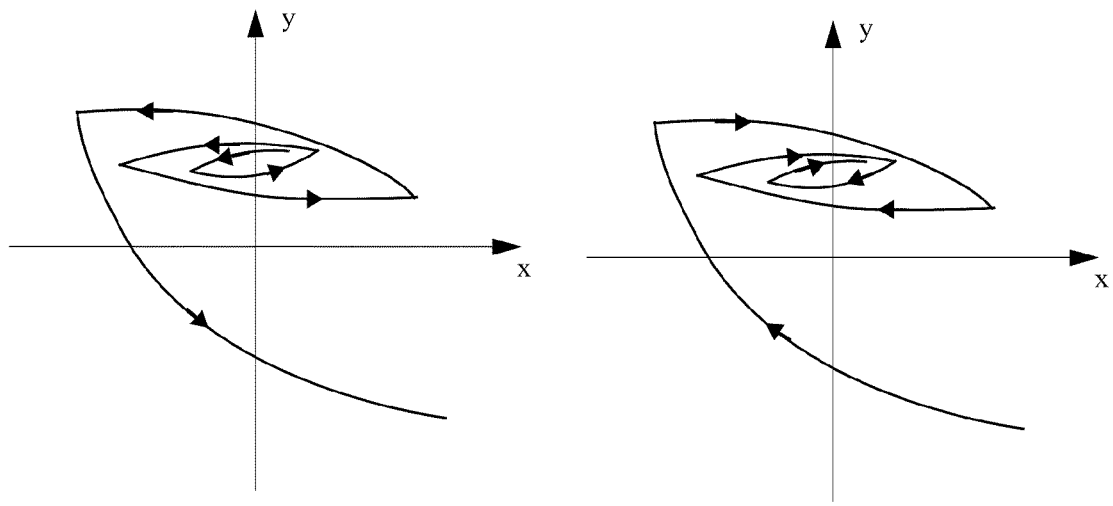
FIG. 1B
FIG. 1C

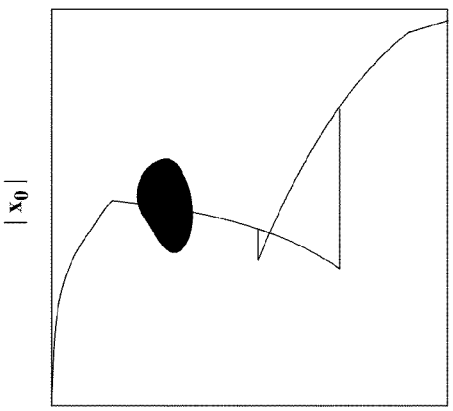
FIG. 1F  *Adapted from Brambilla et al., pp 115-136 in Harrison and Uppal*
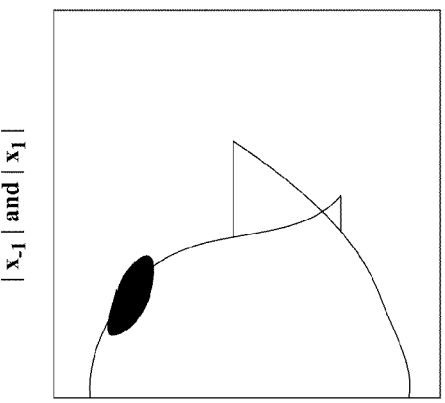
FIG. 1G  *Adapted from Brambilla et al., pp 115-136 in Harrison and Uppal*
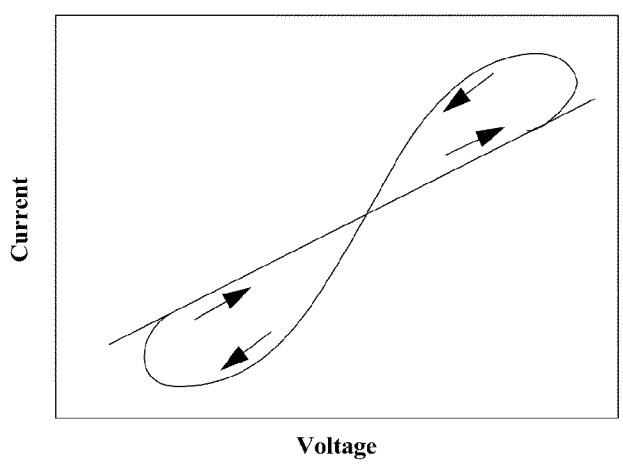
FIG. 1H  *Adapted from Walker (http://www.nobeliefs.com/memristor.htm)*

$f(t)=\{|f(t)|, Arg[f(t)]\}$ $\qquad\qquad\qquad\qquad$ $j(t)=\{|f(t)|, h(Arg[f(t)])\}$ $f(t)=\{|f(t)|, Arg[f(t)]\}$ $\qquad\qquad\qquad\qquad$ $k(t)=\{|h_A f(t)|, h_\phi(Arg[f(t)])\}$

ADVANCED SYNTHESIZED HYSTERESIS FOR SIGNAL PROCESSING, CONTROLLERS, MUSIC, AND COMPUTER SIMULATIONS IN PHYSICS, ENGINEERING, AND ECONOMICS

CROSS-REFERENCE TO RELATED APPLICATIONS

Pursuant to 35 U.S.C. §119(e), this application claims benefit of priority from Provisional U.S. Patent application Ser. No. 61/365,785, filed Jul. 20, 2010, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

The invention pertains to the synthesis of various types of hysteresis, and in particular the synthesis of hysteresis operations for use in controllers, the synthesis of advanced form of hysteresis, and the advanced synthesized hysteresis for various applications such as signal processing, controllers, music, and computer simulations as may be used in physics, engineering, economics, as well as other areas.

Hysteresis occurs in many aspects and types of physical processes [A]. In mechanical engineering hysteresis occurs in gears and other mechanical structures. Many types of familiar [B] and newly emergent [C] magnetic materials and devices exhibit various forms of magnetization hysteresis.

Hysteresis also occurs in other types of physical processes, particularly phase transition processes [D] (including self-organizing criticality) as is well known but also notably in optical processes [E, F], some of which exhibit unusually shaped hysteresis curves [G], as well as friction, fluidics, hydrology, bilogy, and superconditivity.

Hysteresis also occurs in financial and economic systems (for example, often occurring in modeling the effects of unemployment in an economy) [,H,I,J,K]. In the inventor's own work, hysteresis can occur in economic systems (as well as the abstractions of transaction costs as applied to communications, computers, and manufacturing systems) in responses to or control of transaction costs.

Many systems and applications include electronic or computer control systems that operate on hysteretic subsystems or processes, and the hysteretic behavior complicates the design and operations of those control systems [L,M]. Many forms of sophisticated optimal control extend into control arrangements that involve hysteresis, as do simple household thermostats. Hysteresis processes also arise in game theory.

In electronics, hysteresis processes have historically been utilized in noise-rejection circuits (Schmitt triggers) and nonlinear oscillators. Electronic transformers and inductors inherently exhibit electrical hysteresis effects due to the natural hysteretic properties of the materials used to make the transformer core. More profoundly, the theoretically predicted (Leon Chua) and recently perfect (Stanley Williams and team) memistor, the "fourth" passive circuit element [N], exhibits hysteresis processes (including the noteworthy "pinched" form of hysteresis curve) [O,P]. Hysteresis processes are also employed in the design and operation of certain types of electrical AC-powered synchronous motors used to render stable exact speeds.

In electronic vacuum-tube electric guitar amplifiers, hysteresis occurs in overdriven vacuum-tube amplifier output transformers due to the natural hysteretic properties of the materials used to make the transformer core and is a component (among many) of overdriven electric guitar vacuum-tube amplifier distortion that has become an essential aspect of contemporary popular music worldwide for many decades.

Mathematically, hysteresis effects are effectively a type of bifurcation and are closely related to subjects such as catastrophe theory [Q]. Even simple hysteresis models can comprise tremendously extensive and intriguing families of behaviors. The modeling, study, and generalizations of hysteresis phenomena and nonlinear differential equations that possess them has been and remains a deep and interesting area of study, involving sophisticated mathematical techniques, tools, elements, and structures including differential inclusions, linear and nonlinear operator theory, singular perturbations, differential representations, linear and nonlinear spectral theory, topological degree, Poincare maps, cellular and differential automata, nural network representations, fractional calculus and fractional-order integral/differential equations (in modeling, a source of hysteresis, and as a superior type of control system compensator for systems with input hysteresis), and fractal analysis [A,R,S,T,U,V,W,X].

Set against this background, the present invention provides a number of innovative steps of commercial value to real-time systems, control systems, numerical simulations of system, signal processing, music audio, and other applications.

In partial relation to the present invention, the inventor has found that more generally hysteresis effects in waveform distortion and waveform shaping processes can create valuable amplitude-varying spectral effects of particular interest in musical sound synthesis and musical signal processing. Further in partial relation to the present invention, the inventor has found that time-variation or modulation of parameters controlling parameterized synthesized hysteresis also create valuable spectral effects.

Additionally, such parameterized synthesized hysteresis as developed for the above and other applications appear to be valuable as control systems elements and as "metamodeling" elements within numerical system simulations.

Further, in that natural hysteresis effects in practice exhibit inherent multiple-input aspects, and often multiple-output aspects, it is useful to further extend the synthesis of hysteresis to encompass the synthesis of vector hysteresis processes.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention provides a method for synthesis of a hysteresis function of a plurality of inputs, the method comprising:

Receiving a plurality of input signals;

Processing the plurality of input signals with at least a parameterized multivariable nonlinearity, the parameterized multivariable nonlinearity serving as a parameterized hysteron, to produce at least one output signal; and Processing the plurality of input signals with at least a controller function, the controller function comprising memory and producing at least one control signal responsive to at least one of the plurality of input signals, the at least once control signal for controlling the parameterized hysteron, wherein the at least one control signal is used to control the parameterized hysteron so as to create a hysteretic response to at least one of the plurality of input signals.

For multi-variable (vector) hysteresis synthesis, the control signals produced by a controller function can accordingly be hysteretic ally responsive to at least one of a plurality of input signals.

Another aspect invention also provides for a variety of scalar hysteresis synthesis systems and methods, for example employing the further aspects of the invention provided below (as well as elsewhere in the specification). For scalar, the control signals produced by a controller function can accordingly be hysteretically responsive to the input signal.

In another aspect of the invention the controller function is responsive to at least one extremal value of the amplitude of at least one of the plurality of input signals. In another aspect of the invention the controller function is responsive to at least an integration of the amplitude of at least one of the plurality of input signals. In another aspect of the invention the controller function is responsive to at least one time-derivative of the amplitude of at least one of the plurality of input signals.

In another aspect of the invention the controller function is responsive to at least one extremal value of the phase of at least one of the plurality of input signals. In another aspect of the invention the controller function is responsive to at least an integration of the phase of at least one of the plurality of input signals. In another aspect of the invention the controller function is responsive to at least one time-derivative of the phase of at least one of the plurality of input signals.

In another aspect of the invention the controller function is responsive to at least one extremal value of a quantity responsive to the signal spectrum of at least one of the plurality of input signals. In another aspect of the invention the controller function is responsive to at least an integration of a quantity responsive to the signal spectrum of at least one of the plurality of input signals. In another aspect of the invention the controller function is responsive to at least one time-derivative of of a quantity responsive to the signal spectrum of at least one of the plurality of input signals.

In another aspect of the invention the control signal comprises a single control signal.

In another aspect of the invention the control signal comprises a plurality of control signals.

BRIEF DESCRIPTION OF THE DRAWINGS

The above and other aspects, features and advantages of the present invention will become more apparent upon consideration of the following description of preferred embodiments taken in conjunction with the accompanying drawing and figures.

FIG. 1A depicts a representation of an example hysteresis trajectory "loop" representing phenomenon present, for example, in magnetic systems subjected to a periodic input.

FIG. 1B depicts a representation of a more general example of a hysteresis trajectory curve for a hysteretic system, such as that producing the hysteresis trajectory curve depicted in FIG. 1A, resulting from an input that repeatedly reverses direction over an interval of time with monotonically increasing peak-to-peak amplitude.

FIG. 1C depicts a representation of a more general example of a hysteresis trajectory curve for a hysteretic system, such as that producing the hysteresis trajectory curve depicted in FIG. 1A, resulting from an input that repeatedly reverses direction over an interval of time with monotonically decreasing peak-to-peak amplitude.

FIG. 1F and FIG. 1G, reproduced from [E], depict representations of an example "butterfly-shaped" hysteresis loops that occur in quantum-level optical mixing phenonmena.

FIG. 1H depicts a representation of an example "pinched" hysteresis loop that occur in memristor implementations [P].

DETAILED DESCRIPTION

Figure 1D:
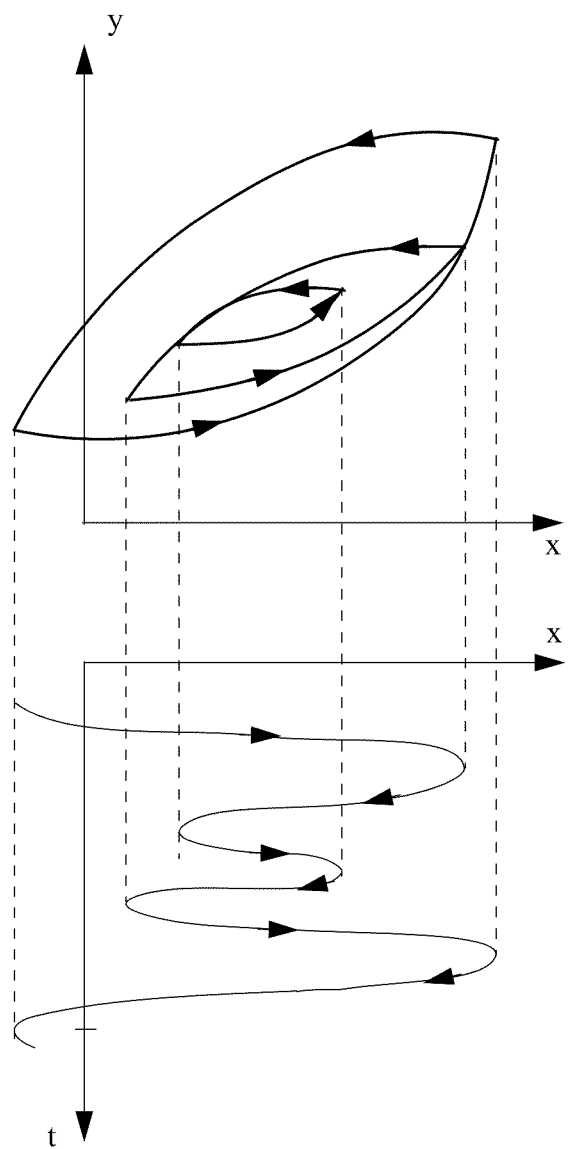
FIG. 1D depicts a representation of an example hysteresis trajectory resulting from an input that repeatedly reverses direction over an interval of time but with irregularly-varying peak-to-peak amplitude.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Those of ordinary skill in this technological field will understand that other embodiments may be utilized, and structural, electrical, as well as procedural changes may be made without departing from the scope of the present invention. Wherever possible, the same reference numbers will be used throughout the drawings to refer to the same or similar parts.

Example Scalar Hysteresis Curves

Traditional hysteresis curves for transformers, gears, pseudo-elastic deformation, etc. are well known (see for example [R]). Most such hysteresis curves are at least piecewise continuous although they typically have discontinuities in at least the first derivative. Many such hysteresis curves do not include "dead-zones," but notable exceptions to this are mechanical toothed-gear hysteresis under rotational direction reversal and "Schmitt trigger" electrical circuits.

Although there are many types and variations of hysteresis curves, FIG. 1a depicts a commonly rendered representation of a closed hysteresis curve ("loop"). More specifically, FIG. 1A depicts a representation of an example typical hysteresis trajectory curve "loop" representing phenomenon present, for example, in magnetic systems subjected to a periodic input. These types of curves are sometimes referred to as a "limiting loop" or related terminology.

FIG. 1B depicts a representation of a more general example of a hysteresis trajectory curve for a hysteretic system, such as that producing the hysteresis trajectory curve depicted in FIG. 1A, resulting from an input that repeatedly reverses direction over an interval of time with monotonically increasing peak-to-peak amplitude. These types of open (nonclosed or "non-loop") curves, regardless of direction of travel over time, are sometimes referred to as a "reversal curve" or related terminology.

FIG. 1C depicts an analogous "reversal curve" representation of a more general example of a hysteresis trajectory curve for a hysteretic system, such as that producing the hysteresis trajectory curve depicted in FIG. 1A, resulting from an input that repeatedly reverses direction over an interval of time with monotonically decreasing peak-to-peak amplitude.

Figure 1E:
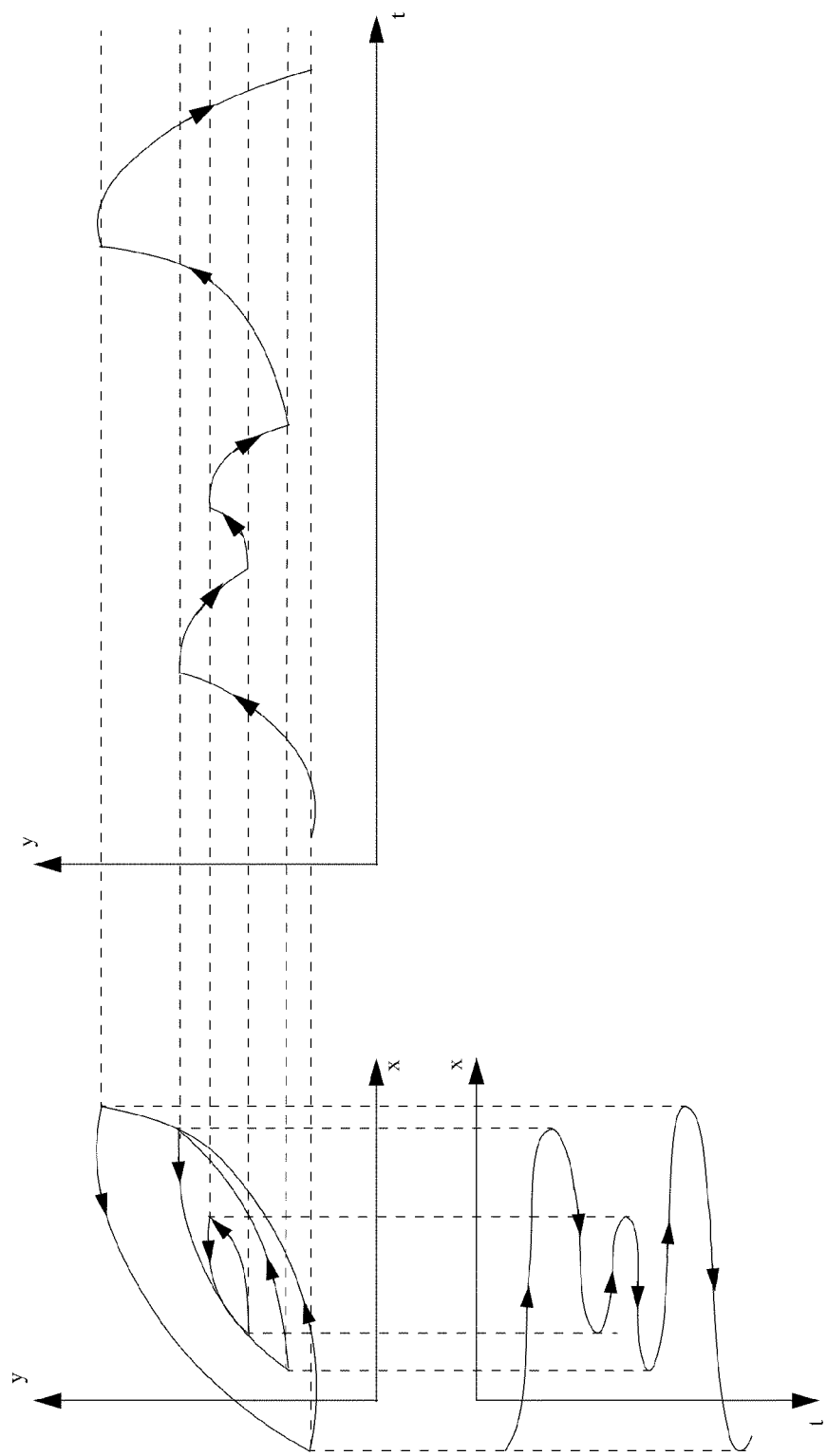
FIG. 1E depicts how the hysteresis process such as that associated with FIG. D transforms the input signal into an output signal.

FIG. 1D depicts a representation of an example hysteresis trajectory resulting from an input that repeatedly reverses direction over an interval of time but with irregularly-varying peak-to-peak amplitude. FIG. 1E depicts how the hysteresis process such as that associated with FIG. 1D transforms the input signal into an output signal.

FIG. 1F and FIG. 1G, reproduced from [E], depict representations of an example "butterfly-shaped" hysteresis loops that occur in quantum-level optical mixing phenomena.

FIG. 1H depicts a representation of an example "pinched" hysteresis loop that occur in memristor implementations [P].

Relevant Example Hysteresis Modeling and Analysis

The hysteresis modeling literature is immense [A-X] and continuing to expand. Much of this has to with analysis efforts, the modeling of properties of materials, systems, and processes, and to some extent the design of control systems. The mathematics is rich, inviting, and as deep and intricate as a thinking mathematician or physicist would happily and stridently seek.

The present invention is directed in part to the synthesis of hysteresis processes and their use in real-time systems, control systems, numerical simulations of system, signal processing, music audio, and other applications. Although all of the mathematical machinery and empirical observation behind it are extensively informative to the background of the invention, only a few selected aspects of this extensive mathematics are leveraged in the present invention. Some of the scalar hysteresis modeling concepts useful to the present invention include but are not limited to:

Informal interpretations of scalar hysteresis as nonlinearities with memory attributes that invoke branching [S];

Hysterons which are the individual branches (typically nonlinear, but for the purposes of the present invention will include linear and piecewise-linear) of a hysteresis curve or trajectory Rate-independent aspects of a hysteresis process;

Rate-dependent aspects of a hysteresis process;

"Selector" and "almost selector" aspects adapted from representations of multi-valued functions [L]—other names and variations of these exist, for example "switch function," "switching-function," and in some terminologies "branch condition," "branching condition," etc.;

Local memory aspects wherein future-time values of such aspects a hysteresis process output are uniquely determined by the present-time value of that output and future-time behavior of the input. In somewhat deeper mathematical formulations, local memory aspects of a hysteresis process are "Play" and "Stop" operators [L]. In a differential model, each point in the input-output graph of a local-memory aspect of a hysteresis process can only lead to only two possible future paths. A Schmitt trigger electrical circuit is an example of a local memory aspect of a hysteresis process;

Non-local memory aspects wherein future-time values and future-time paths of such aspects a hysteresis process output depend on more than the current output value. Two important examples are:

Values of the most recent input extrema,

Values of the two most recent input extrema,

Values of "all" (perhaps asymptotically suppressed) input extrema,

The entire history of input values overtime,
Rate-of-change over time of the input.

In a differential model, each point in the input-output graph of a local-memory aspect of a hysteresis process can only lead to many (or an infinite number) of possible future paths. An electrical transformer is an example of a non-local memory aspect of a hysteresis process.

It is with regards to non-local memory aspects a hysteresis process that additional mathematical hysteresis models (such as Prieisach, Stoner-Wohlfarth [S],differential [U], automata [R]) and aspects of multi-valued functions [L] can be further employed in the implementation of hysteresis synthesis as provided for by the present invention.

Example Scalar Hysteresis Synthesis Such as that Taught in U.S. Pat. No. 7,309,828

Scalar hysteresis is the form of hysteresis wherein there is a single input variable and a single output variable. Scalar hysteresis is the form of hysteresis that is most discussed, taught, and studied.

Figure 1I:
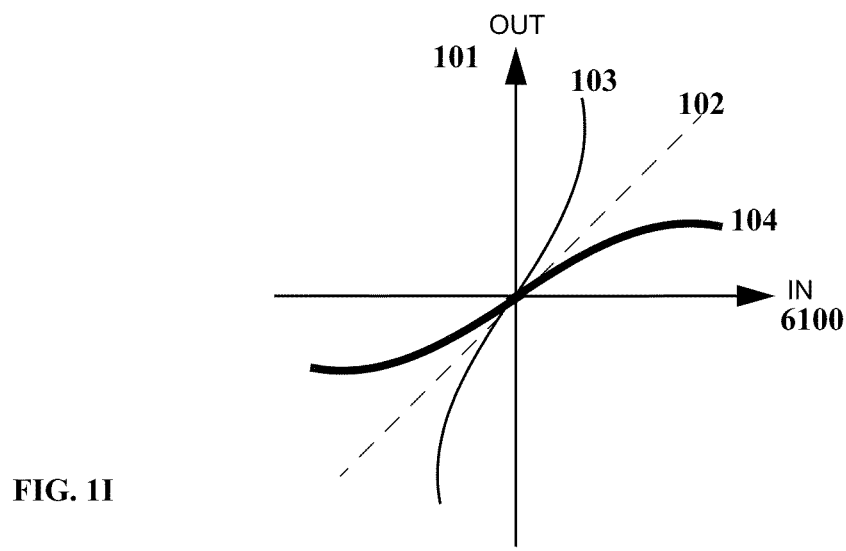
FIGS. 1I, 1J, and 1K, reproduced from FIG. 61 of the inventor's patent U.S. Pat. No. 7,309,828, depicts aspects of hysteresis synthesis taught therein.
Figure 1J:
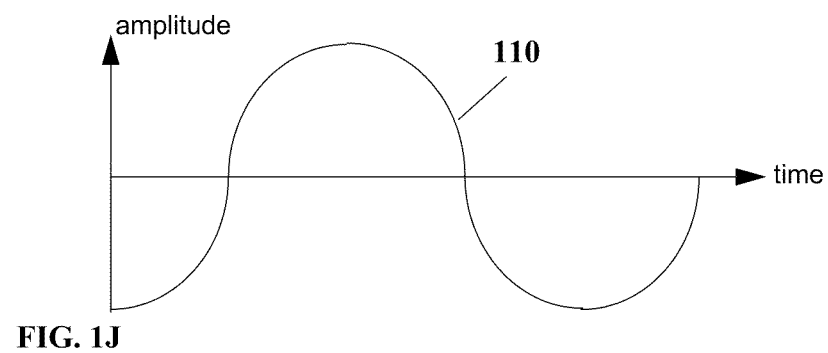

FIGS. X1I, X1J, and X1K, reproduced from FIG. 61 of the inventor's previous patent U.S. Pat. No. 7,309,828 relating to hysteresis synthesis, shows aspects of hysteresis synthesis as provided for by that patented invention. These aspects of hysteresis synthesis pertain to at least scalar A brief review is provided here:

The input/output graph depicted in FIG. 1I shows example symmetric curves that are linear 102, superlinear 103, and sub-linear 104 along with the time/amplitude oscillograph of an example applied waveform 110 depicted in FIG. 1J. Other types of symmetric or non-symmetric nonlinearities can also be used.

A time-derivative operation on the applied signal waveform 110 followed by sign detection reveals whether the applied signal waveform is at any instant increasing or decreasing. As an example, the applied signal waveform 110 would be applied to one nonlinear warping function such as 103, 104 when increasing and the other when decreasing, resulting in the waveform depicted in FIG. 1K comprised of solid-line curve segments 113 (thin-line) and 114 (bold-line) rather than the dashed-line waveform 112 that would have been created by the linear curve 102. The nonlinear branch segments 113, 114 serve here as hysterons.

In order to allow the applied input signal to vary in amplitude and still maintain piecewise-continuity of the waveform, the invention of U.S. Pat. No. 7,309,828 provides for the warping nonlinearities to be themselves adaptively scaled or otherwise altered based on amplitude information from the current and previous direction reversals, moving average of waveform area or waveform power, etc. These aspects address at least local memory, non-local memory, selector, and rate-independent aspects of various types of hysteresis processes.

The invention of U.S. Pat. No. 7,309,828 also provides for aspects of the hysteresis synthesis process, such as curve shapes and degrees of dependency on waveform history, to be varied in real-time by control parameters. The invention of U.S. Pat. No. 7,309,828 allows for such control parameters to be used for the modulation of synthesized hysteresis processes, for example in the production of electronic music signal processing and electric guitar distortion. The invention of U.S. Pat. No. 7,309,828 also allows for such control parameters to be used for the adjustment of synthesized hysteresis processes, for example under control parameter recall in the context of stored program control.

More Advanced Hysteresis Synthesis

The present invention provides for such control parameters to be used for the tuning, adaptation, etc. of synthesized hysteresis processes. The present invention further provides for such control parameters to be used as an element and/or method in the synthesis of more complex synthesized hysteresis processes. For example, synthesized hysterons can be parameterized in this fashion and control signals can be used to adjust synthesized hysteron parameters. The control signals can, for example, be produced by a controller function according to the outputs of selectors, signal time-derivative sign detectors, integrators, fractional dynamical processors, control systems, system measurement sensors, etc.

Figure 1K:
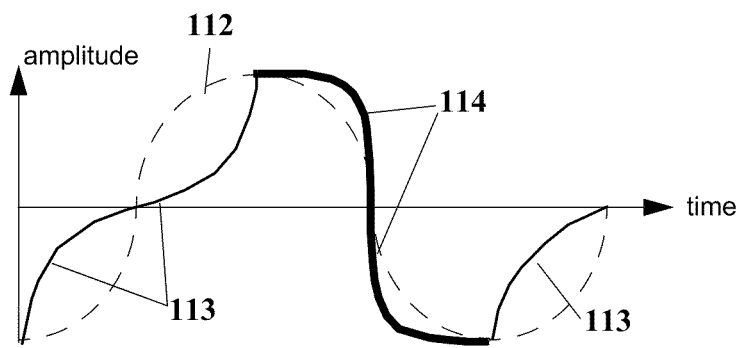
Figure 2:
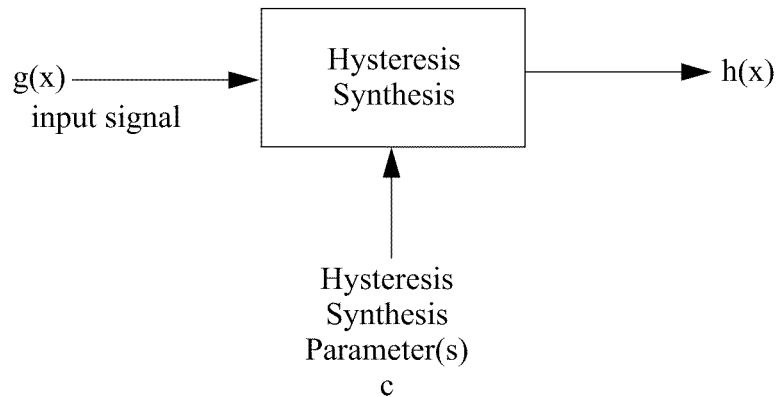
FIG. 2 depicts an input-output representation that is applicable to the arrangement of FIG. 1b as well as other types of hysteresis discussed herein and elsewhere.

FIG. 2 depicts an input-output representation that is applicable to the hysteresis synthesis arrangements of FIGS. 1I through 1K as well as other types of hysteresis discussed herein and elsewhere. Here the input signal $g(x)$ is operated on by the Hysteretic Synthesis element to create an output signal $h(x)$. In an embodiment of the invention, the characteristics of the type and character of the hysteresis operation invoked by the Hysteretic Synthesis element can be parameterized, i.e., determined by the value of one or more parameter(s). In an embodiment of the invention, the value of one or more of these parameter(s) can be used as a control input, here designated as the quantity c. If there are a plurality of such parameters structured as a control input, c is a vector. If there is only a single such parameter structured as a control input, c is a scalar.

The present invention provides additional and more advanced types of synthesized hysteresis for use in applications including signal processing, controllers, music, and computer simulations in physics, engineering, and economics. In particular, the present invention provides for, among other things, the following types of advanced hysteresis which can be used individually or in combination:

Multi-variable hysteresis synthesis;
Phase hysteresis synthesis;
Frequency-dependent hysteresis synthesis;
Dynamical variation of hysteresis parameters for hysteresis synthesis.

Each of these is considered in more detail in the sections to follow.

Additionally, the present invention provides for the use of synthesized hysteresis of the types described in U.S. Pat. No. 7,309,828, and/or the types of advanced hysteresis listed above, in control systems, computer simulation, and as a component in the advanced hysteresis synthesis systems and methods to be presented.

For scalar hysteresis synthesis, the control signals produced by a controller function can accordingly be hysteretic ally responsive to the input signal. For multi-variable (vector) hysteresis synthesis, the control signals produced by a controller function can accordingly be hysteretic ally responsive to at least one of a plurality of input signals.

In an example implementation the controller function is responsive to at least one extremal value of the phase of at least one of the plurality of input signals. In another implementation the controller function is responsive to at least an integration of the phase of at least one of the plurality of input signals. In another implementation the controller function is responsive to at least one time-derivative of the phase of at least one of the plurality of input signals.

In an example implementation the controller function is responsive to at least one extremal value of the amplitude of at least one of the plurality of input signals. In another implementation the controller function is responsive to at least an integration of the amplitude of at least one of the plurality of input signals. In another implementation the controller function is responsive to at least one time-derivative of the amplitude of at least one of the plurality of input signals.

In an example implementation the controller function is responsive to at least one extremal value of a quantity responsive to the signal spectrum of at least one of the plurality of input signals. In another implementation the controller function is responsive to at least an integration of a quantity responsive to the signal spectrum of at least one of the plurality of input signals. In another implementation the controller function is responsive to at least one time-derivative of of a quantity responsive to the signal spectrum of at least one of the plurality of input signals.

In an example implementation the controller function comprises fractional-order dynamics.

A wide range of possiblities are possible for implementations and embodiments of the controller function as testified by the discussion made thus far, and the examples provided above are in no way limiting.

Multi-Variable Hysteresis Synthesis

An argument can be made that hysteretic properties of materials depends on so many factors that any representation of hysteresis processes should be provided in terms of vector quantities ([B], p. 11). There are also spatial aspects of materials, mechanical systems, chemical systems, electrical systems, etc. that can merit consideration of additional input variables and/or additional output variables. The broader environment of other types of hysteretic processes (for example those occurring in financial and economics models, chemical systems, biological systems, optical systems, etc.) also can merit consideration of additional input variables and/or additional output variables. Multiple-input and/or multiple-output hysteresis processes can also be of value in new types of electronic music sound synthesis and electric guitar signal processing.

There are a number of ways in which hysteresis can be imposed on multiple input variables or vector-valued quantities. These include but are not limited to:

Arrangements wherein the hysteresis is variable-separable;

Arrangements wherein the hysteresis is hierarchical in the variables;

Arrangements wherein the hysteresis is cross-coupled in the variables;

Arrangements wherein the hysteresis comprises covariant nonlinearity.

Figure 3:
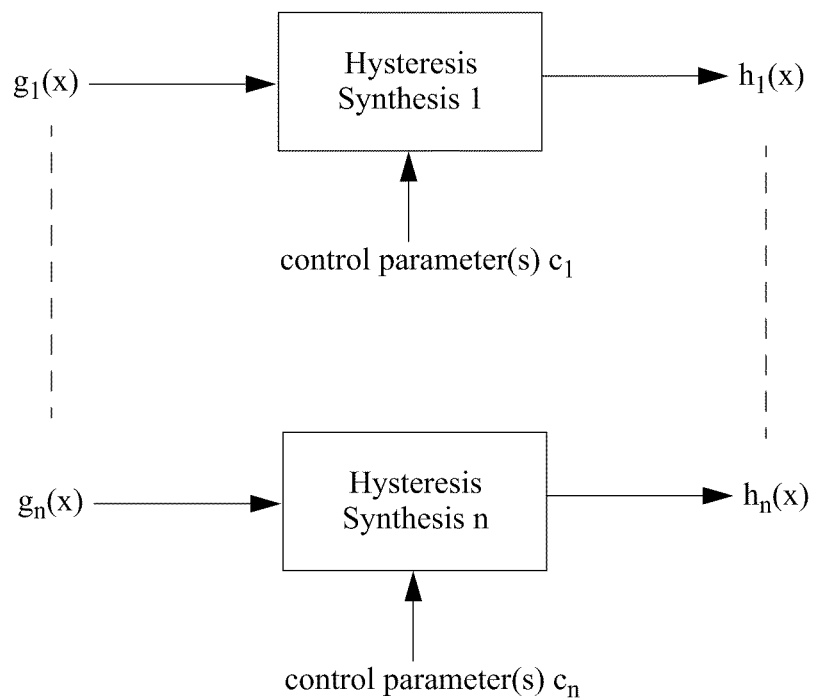
FIG. 3 depicts a multi-variable hysteresis synthesis arrangement wherein the hysteresis is variable-separable.

FIG. 3 depicts a multi-variable hysteresis synthesis arrangement wherein the hysteresis is variable-separable. Here a separate hysteresis synthesis element, such as the one depicted in FIG. 2, can be used for each of the input variables. In some situations and applications, the resulting output quantities can be further combined in some manner, for example subjected to a linear transformation, a non-linear vector-domain function, vector input dynamical system, etc.

Figure 4:
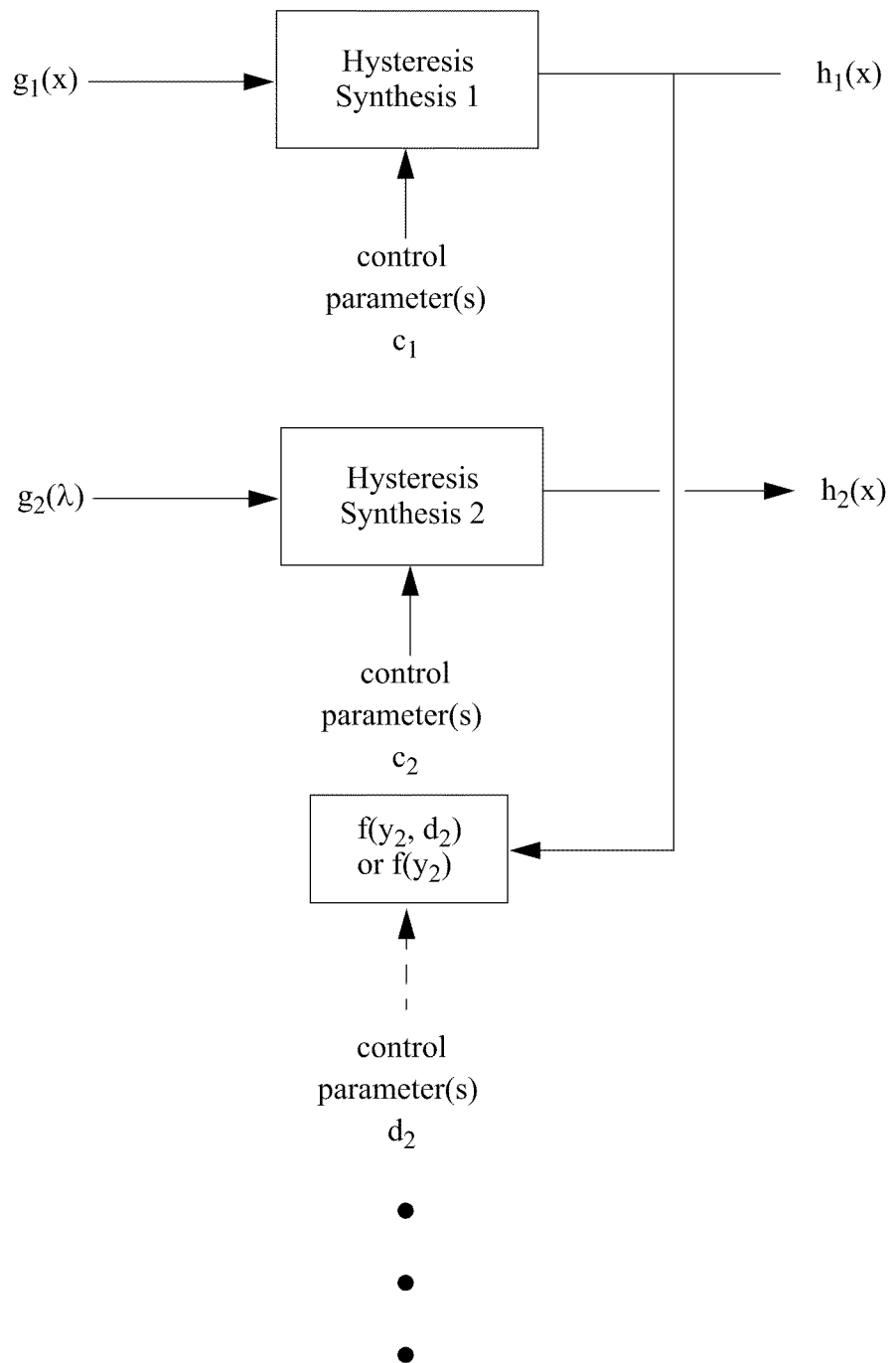
FIG. 4 depicts a multi-variable hysteresis synthesis arrangement wherein the hysteresis is hierarchical in the variables.

There are many possible ways to obtain multi-variable hysteresis synthesis arrangements wherein the hysteresis is hierarchical in some fashion. FIG. 4 depicts a multi-variable hysteresis synthesis arrangement wherein the hysteresis is hierarchical in the variables. In this particular example, the output of the Hysteresis Synthesis 1 element is used to control, entirely or in part, the hysteresis control parameter(s) $c_2$ of Hysteresis Synthesis 2 element via the function f(*). In some embodiments, the function f(*) can be provided with additional external control parameter(s) d. If there are a plurality of such parameters structured as an external control input, d is a vector. If there is only a single such parameter structured as an external control input, d is a scalar. Many other hysteresis synthesis arrangements wherein the hysteresis is hierarchical are possible and are provided for by the invention.

Figure 5:
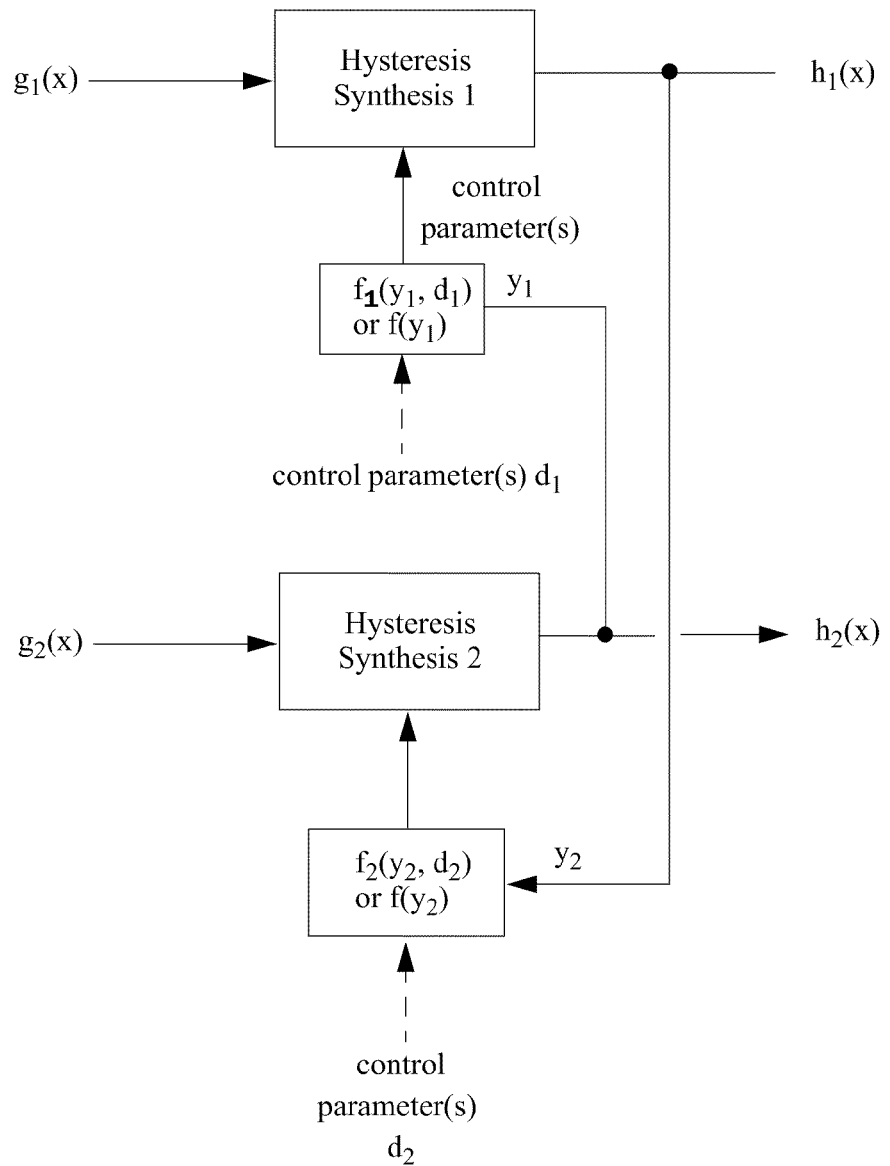
FIG. 5 depicts a multi-variable hysteresis synthesis arrangement wherein the hysteresis is cross-coupled in the variables.

There are many possible ways to obtain multi-variable hysteresis synthesis arrangements wherein the hysteresis is cross-coupled in some fashion. To begin it is noted that the scalar or vector parameter input c in the parameterized hysteresis synthesis arrangement depicted in FIG. 2 can serve as one or more additional input variables. Depending on what the scalar or vector parameter input c affects in the parameterized hysteresis synthesis, it could itself experience hysteretic effects and/or vary the hysteretic effects responsive to the input signal g(x). FIG. 5 depicts another example multi-variable hysteresis synthesis arrangement wherein the hysteresis is cross-coupled in the variables. In this particular example, the output of the Hysteresis Synthesis 1 element is used to control, entirely or in part, the hysteresis control parameter(s) $c_2$ of Hysteresis Synthesis 2 element via the function $f_2$(*). Additionally, the output of the Hysteresis Synthesis 2 element is used to control, entirely or in part, the hysteresis control parameter(s) $c_1$ of Hysteresis Synthesis 1 element via the function $f_1$(*). In some embodiments the function $f_1$(*) can be provided with additional external control parameter(s) $d_1$. If there are a plurality of such parameters structured as an external control input, $d_1$ is a vector. If there is only a single such parameter structured as an external control input, d is a scalar.

In some embodiments, the function $f_1$(*) can be provided with additional external control parameter(s) $d_1$. If there are a plurality of such parameters structured as an external control input, $d_1$ is a vector. If there is only a single such parameter structured as an external control input, $d_1$ is a scalar. Similarly, in some embodiments the function $f_2$(*) can be provided with additional external control parameter(s) $d_2$. If there are a plurality of such parameters structured as an external control input, $d_2$ is a vector. If there is only a single such parameter structured as an external control input, d is a scalar. In some embodiments, the function $f_2$(*) can be provided with additional external control parameter(s) $d_2$. If there are a plurality of such parameters structured as an external control input, $d_2$ is a vector. If there is only a single such parameter structured as an external control input, $d_2$ is a scalar. Many other hysteresis synthesis arrangements wherein the hysteresis is hierarchical are possible and are provided for by the invention.

Figure 6A:
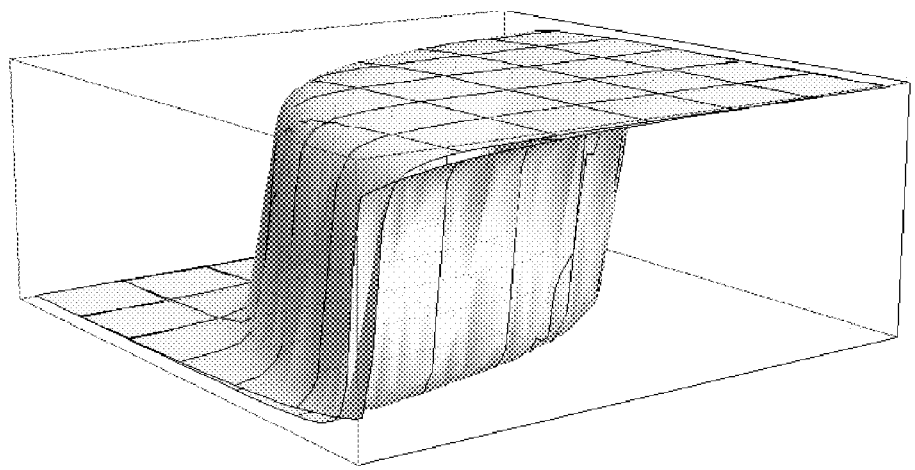
FIGS. 6A and 6B depict two viewpoints of an exemplary two-input one-output multi-variable hollow-volume hysteresis surface comprised of joined but distinct hysteron surfaces each comprising covariant nonlinearity and inducing covariant hysteretic effects for each of the two input variables.
Figure 6B:
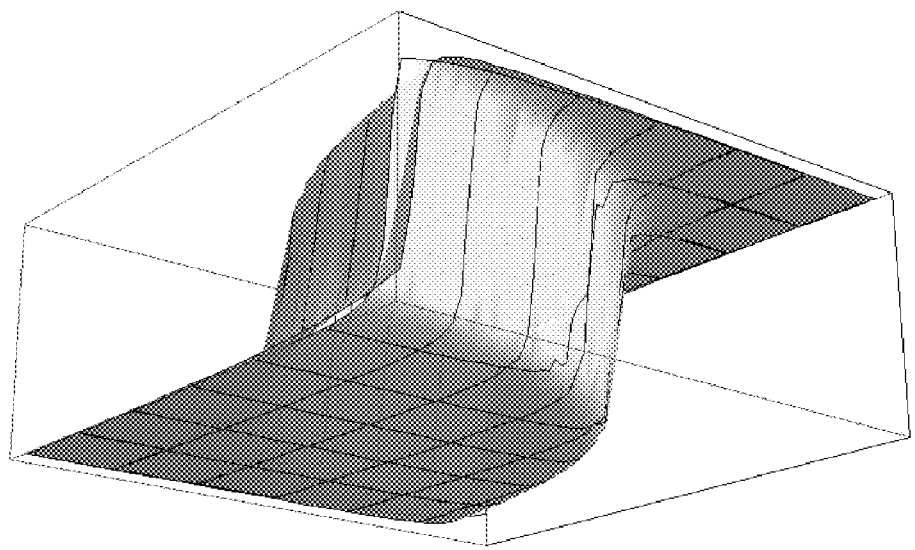

More generally, multiple-input hysteresis processes comprises a multi-variable covariant nonlinearity. FIGS. 6A and 6B depict two viewpoints of an exemplary two-input one-output multi-variable hollow-volume hysteresis surface comprised of joined but distinct hysteron surfaces each comprising covariant nonlinearity and inducing covariant hysteretic effects for each of the two input variables. Here the single-variable traditional hysteresis curve (such as that of FIG. 1a) is replaced with a multiple-variable hysteresis surface. Many other multi-variable covariant hysteron surfaces, volumes, and hysteresis synthesis arrangements are possible and are provided for by the invention.

Figure 7:
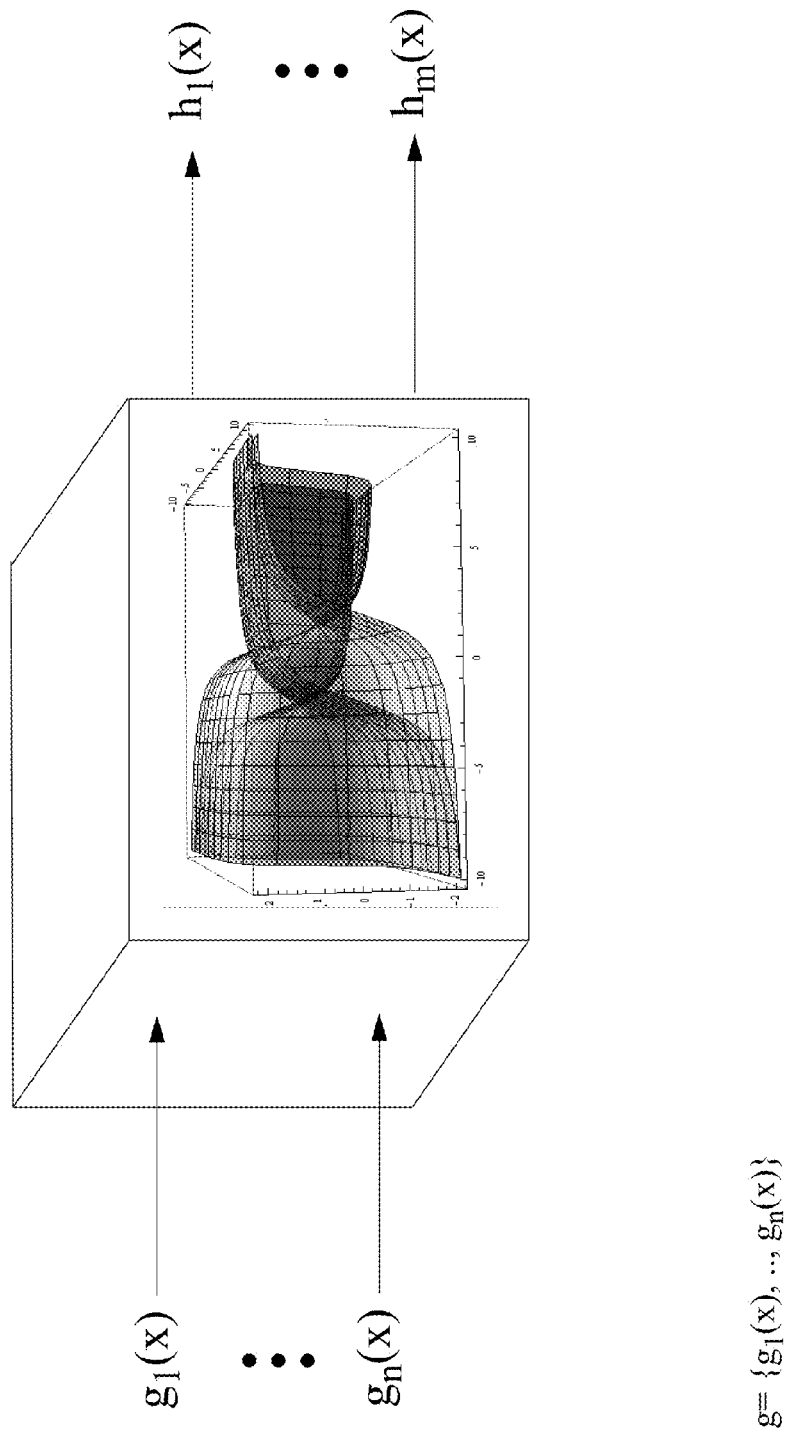
FIG. 7 depicts a multi-variable hysteresis synthesis arrangement wherein the hysteresis comprises a covariant nonlinearity.

FIG. 7 depicts a multiple-input multiple-output hysteresis synthesis arrangement wherein the hysteresis comprises multi-variable covariant nonlinearity. Here there can be n-input variables and m-output variables. In some embodiments m=n, while in other embodiments m and n differ.

Signal-Phase Hysteresis Synthesis

Figure 8A:
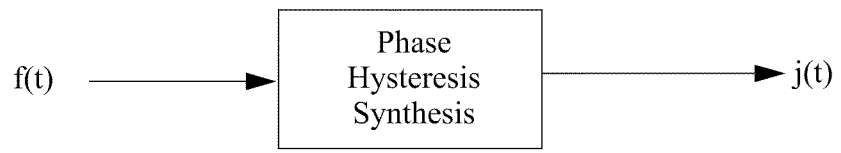
FIG. 8A depicts a arrangement for phase hysteresis synthesis.

Traditionally hysteresis is an operation made on the amplitude history of an input signal. The invention provides for the synthesis of a hysteresis operation made on the phase history of an input signal. FIG. 8A depicts an example arrangement for phase hysteresis synthesis. In an example implementation, signal phase is modulated by a selectable all-pass filter.

In another example implementation, signal phase is modulated by a parameterized all-pass filter responsive to at least one parameter value, and the selection or parameter value is in turn controlled by a controller function responsive to the outputs of selectors, signal time-derivative sign detectors, integrators, fractional dynamical processors, control systems, system measurement sensors, etc.

In an example implementation the parameterized filter serves as a parameterized hysteron. In an example implementation the phase modulation if further responsive to spectral content of the at least one input signal.

The phenomenon driving the phase hysteresis can include input signal phase, but also or alternatively can include input signal amplitude, input signal spectrum, etc.

In an example implementation the controller function is responsive to at least one extremal value of the phase of at least one of the plurality of input signals. In another implementation the controller function is responsive to at least an integration of the phase of at least one of the plurality of input signals. In another implementation the controller function is responsive to at least one time-derivative of the phase of at least one of the plurality of input signals.

In an example implementation the controller function is responsive to at least one extremal value of the amplitude of at least one of the plurality of input signals. In another implementation the controller function is responsive to at least an integration of the amplitude of at least one of the plurality of input signals. In another implementation the controller function is responsive to at least one time-derivative of the amplitude of at least one of the plurality of input signals.

In an example implementation the controller function is responsive to at least one extremal value of a quantity responsive to the signal spectrum of at least one of the plurality of input signals. In another implementation the controller function is responsive to at least an integration of a quantity responsive to the signal spectrum of at least one of the plurality of input signals. In another implementation the controller function is responsive to at least one time-derivative of of a quantity responsive to the signal spectrum of at least one of the plurality of input signals.

Many other hysteresis synthesis arrangements for phase hysteresis synthesis are possible and are provided for by the invention.

Combine Signal-Phase and Signal-Amplitude Hysteresis Synthesis (Hysteretic Filter, Hysteretic PID controller)

Figure 8B:
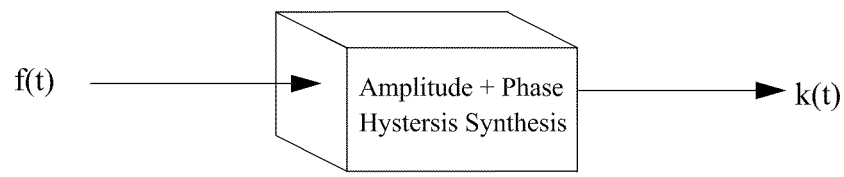
FIG. 8B depicts an arrangement for combined amplitude and phase hysteresis synthesis.

FIG. 8B depicts an example arrangement for combined amplitude and phase hysteresis synthesis. In an example implementation, both signal phase and signal amplitude are modulated by a selectable or parameterized filter affecting both signal amplitude and phase, and the selection or parameter value is in turn controlled by a controller function responsive to the outputs of selectors, signal time-derivative sign detectors, integrators, fractional dynamical processors, control systems, system measurement sensors, etc. The result can be used as a hysteretic filter, hysteretic P.I.D (Proportional, time-Integral, time-Derivative) controllers, higher order controllers, etc.

In an example implementation the parameterized filter serves as a parameterized hysteron. In an example implementation the comprises a parameterized filter imposing at least amplitude modulation on at least one input signal, the amplitude modulation if further responsive to spectral content of the at least one input signal. In an example implementation the phase modulation if further responsive to spectral content of the at least one input signal.

The phenomenon driving the amplitude and phase hysteresis can include input signal phase, but also or alternatively can include input signal amplitude, input signal spectrum, etc.

In an example implementation the controller function is responsive to at least one extremal value of the amplitude of at least one of the plurality of input signals. In another implementation the controller function is responsive to at least an integration of the amplitude of at least one of the plurality of input signals. In another implementation the controller function is responsive to at least one time-derivative of the amplitude of at least one of the plurality of input signals.

In an example implementation the controller function is responsive to at least one extremal value of the phase of at least one of the plurality of input signals. In another implementation the controller function is responsive to at least an integration of the phase of at least one of the plurality of input signals. In another implementation the controller function is responsive to at least one time-derivative of the phase of at least one of the plurality of input signals.

In an example implementation the controller function is responsive to at least one extremal value of a quantity responsive to the signal spectrum of at least one of the plurality of input signals. In another implementation the controller function is responsive to at least an integration of a quantity responsive to the signal spectrum of at least one of the plurality of input signals. In another implementation the controller function is responsive to at least one time-derivative of of a quantity responsive to the signal spectrum of at least one of the plurality of input signals.

Many other hysteresis synthesis arrangements comprising combined amplitude and phase hysteresis synthesis are possible and are provided for by the invention.

More General Rate-Dependent and Frequency-Dependent Hysteresis Synthesis

Figure 8C:
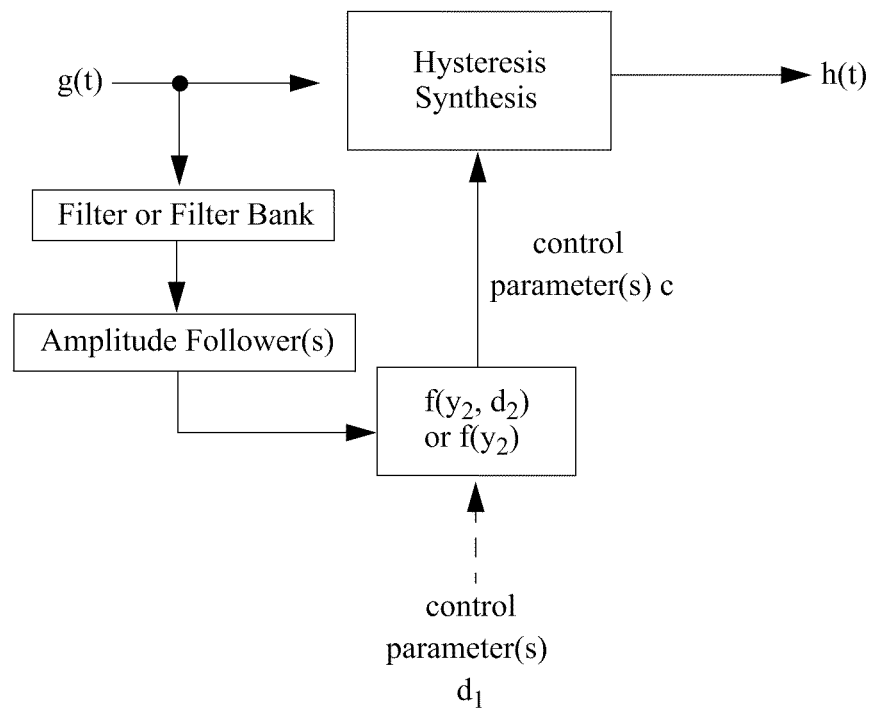
FIG. 8C depicts an arrangement for hysteresis synthesis that is frequency dependent.

The invention provides for the synthesis of a hysteresis operation that is frequency dependent. FIG. 8C depicts an arrangement for hysteresis synthesis that is frequency dependent. In another implementation, a hysteresis synthesis element can internally comprise rate-dependent and/or frequency dependent elements or attributes which in tern invoke rate-dependent and/or frequency dependent hysteresis processes. Many other rate-dependent and frequency-dependent hysteresis synthesis arrangements wherein the hysteresis is hierarchical are possible and are provided for by the invention.

More General Hysteresis Synthesis Comprising Dynamics

Figure 9:
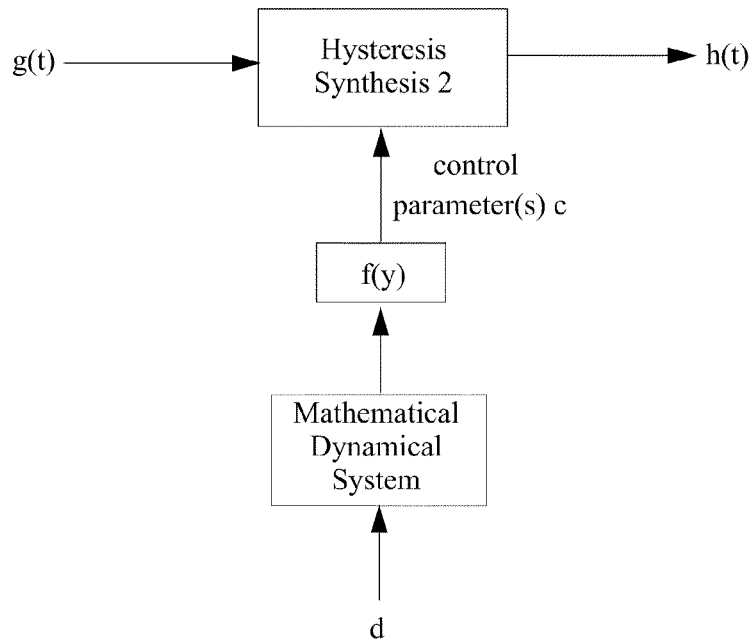
FIG. 9 depicts an arrangement for hysteresis synthesis that varies according to dynamics as defined by a dynamical system.

The invention provides for the synthesis of a hysteresis operation that comprises dynamics. FIG. 9 depicts an arrangement for hysteresis synthesis that varies according to dynamics as defined by a dynamical system. Many other hysteresis synthesis arrangements wherein the hysteresis is hierarchical are possible and are provided for by the invention.

In one embodiment, the control input d is a function of, or in other ways responsive to, the input signal g(t). Many other hysteresis synthesis arrangements wherein the hysteresis is hierarchical are possible and are provided for by the invention.

Use of Synthesized Hysteresis as a Linearizing Pre-Emphasis Element

Figure 10A:
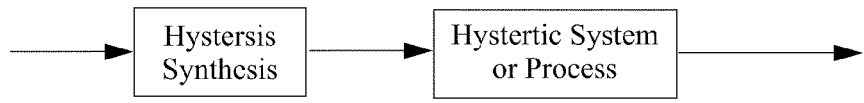
FIG. 10A depicts an example arrangement wherein a hysteresis synthesis element is used to create a compensated input signal to apply to a hysteretic system or process.

The invention provides for the use of synthesized hysteresis as a linearizing pre-emphasis element in conjunction with a natural hysteretic element or process. FIG. 10a depicts an example arrangement wherein a hysteresis synthesis element is used to create a compensated input signal to apply to a hysteretic system or process. In an embodiment, the hysteresis synthesis element is designed so as to approximately compensate for the hysteresis effects of the hysteretic system or process so that the output response is adequately approximate to a linear function of the input.

Use of Synthesized Hysteresis as a Linearizing Post-Deemphasis Element

Figure 10B:
FIG. 10B depicts an example arrangement wherein a hysteresis synthesis element is used to create a compensated output signal from the output of a hysteretic system or process.
Figure 11A:
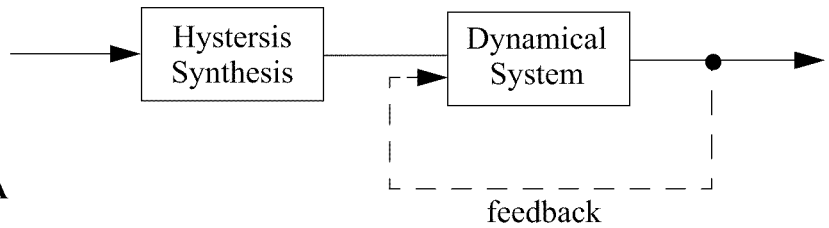
FIG. 11A through FIG. 11D depict various topological arrangements employing hysteresis synthesis in feedback control systems.
Figure 11B:
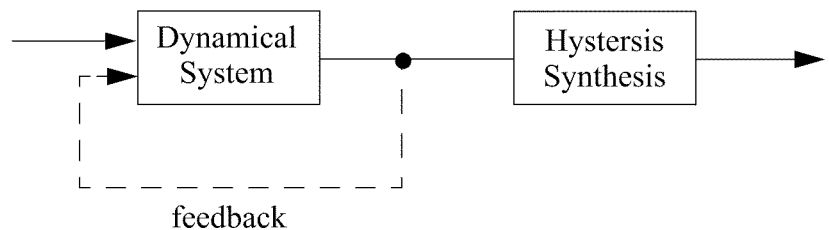
Figure 11C:
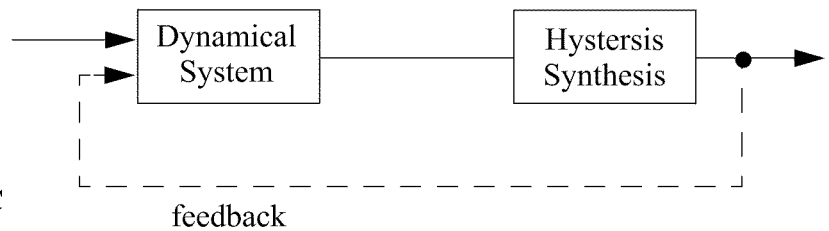
Figure 11D:
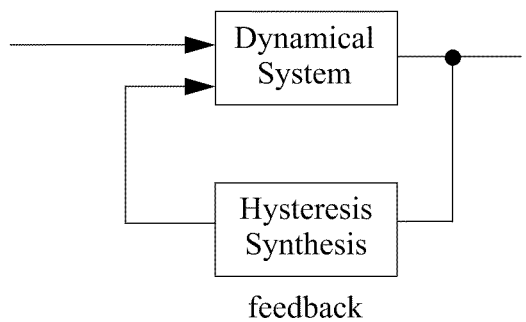
Figure 12A:
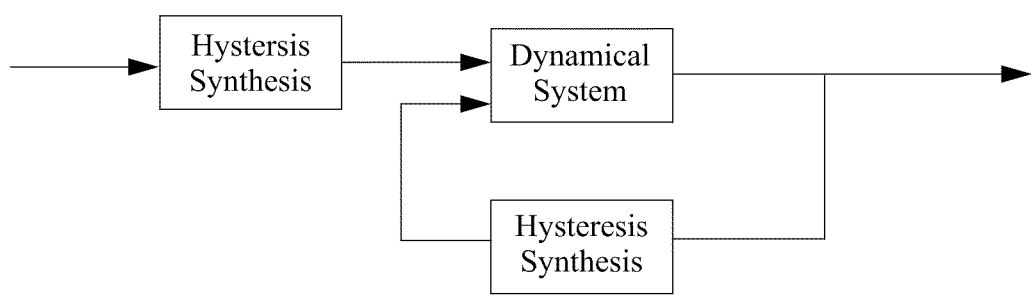
FIGS. 12A through 12E depict arrangements employing hysteresis synthesis in both pre-emphasis/post-deemphasis and feed-back control systems.
Figure 12B:
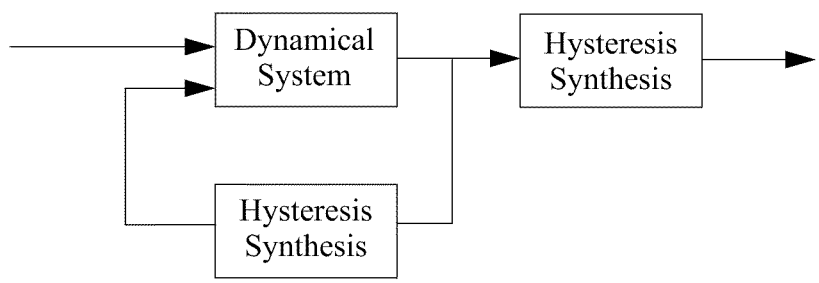
Figure 12C:
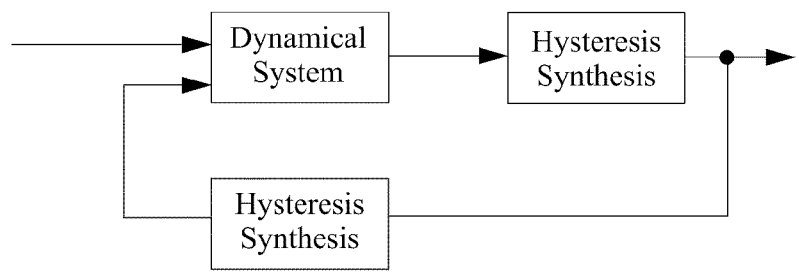
Figure 12D:
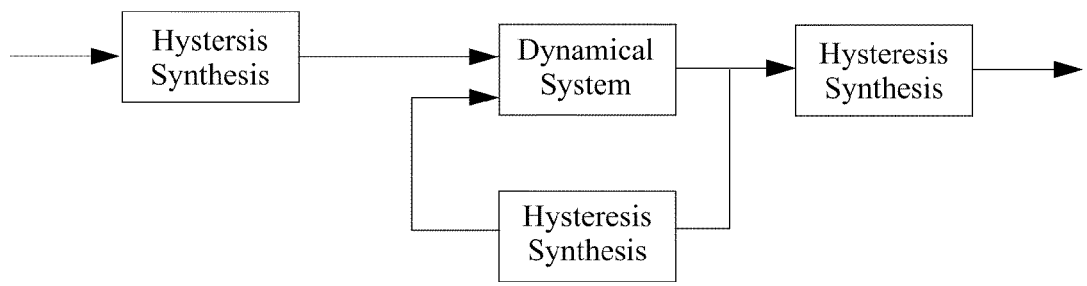
Figure 12E:
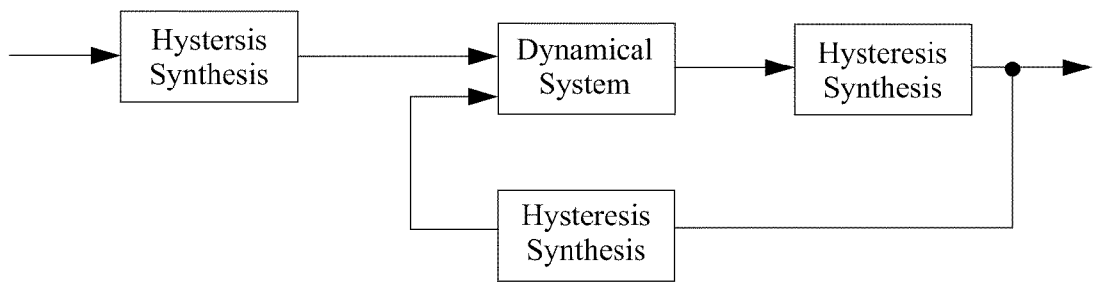

The invention provides for the use of synthesized hysteresis as a linearizing post-deemphasis element in conjunction with a natural hysteretic element or process. FIG. 10b depicts an example arrangement wherein a hysteresis synthesis element is used to create a compensated output signal from the output of a hysteretic system or process. In an embodiment, the hysteresis synthesis element is designed so as to approximately compensate for the hysteresis effects of the hysteretic system or process so that the output response is adequately approximate to a linear function of the input.

Use Synthesized Hysteresis in Feedback Control Systems

The invention provides for the use of synthesized hysteresis in conjunction with or as an element within a control system.

FIGS. 11A through 11D depict various topological arrangements employing hysteresis synthesis in feedback control systems.

FIGS. 12A through 12E depict arrangements employing hysteresis synthesis in both pre-emphasis/post-deemphasis and feed-back control systems.

Use in Computer Simulation or Computer Model

The invention provides for hysteresis synthesis in a computer simulation or computer model. Such a computer simulation or computer model can be used in physics, engineering, economics, etc.

Figure 13:
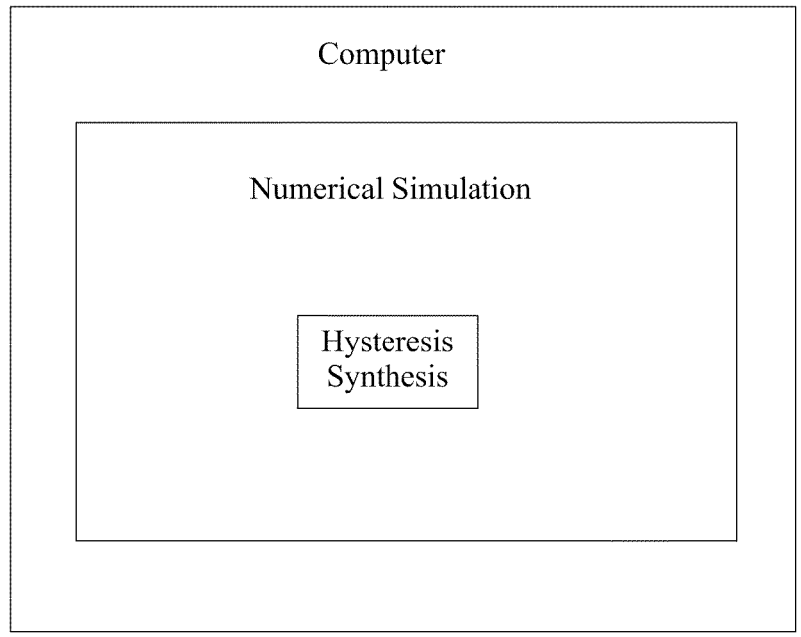
FIG. 13 depicts arrangements employing hysteresis synthesis in a computer simulation.

FIG. 13 depicts arrangements employing hysteresis synthesis in a computer simulation.

Figure 14:
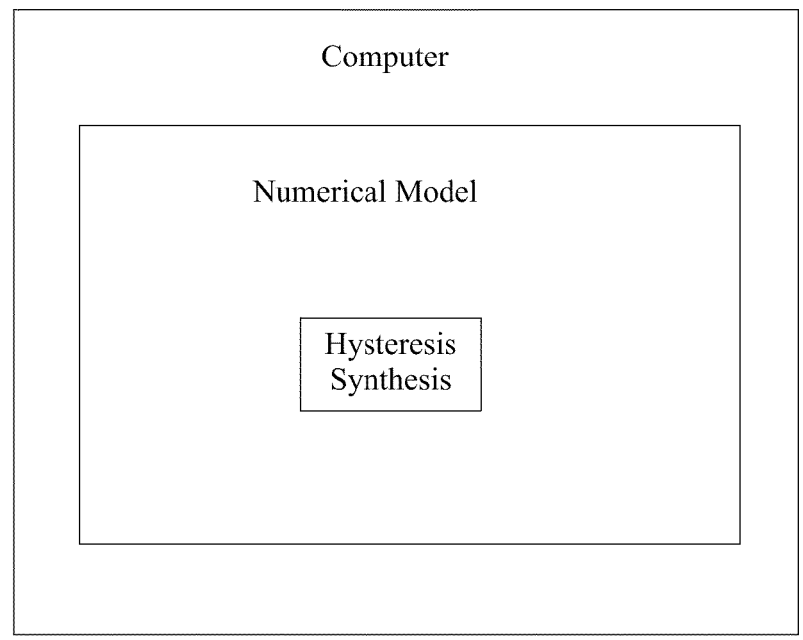
FIG. 14 depicts arrangements employing hysteresis synthesis in a computer model.

FIG. 14 depicts arrangements employing hysteresis synthesis in a computer model.

The aforementioned, as well as other variations, can be implemented as an algorithm on a digital computer, embedded processor, signal processor, or combination of two or more of these.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

REFERENCES

[A] Mayergoyz, I., Betotti, G. . . . , *The Science of Hysteresis* (3 volume set), 2006, Academic Press, ISBN 0124808743.

[B] Bertotti, G., Hysteresis in Magnetism: For Physicists, Materials Scientists, and Engineers (Electromagnetism), 1998, Academic Press, ISBN 0120932709.

[C] Hadjipanayis, G., Magnetic Hysteresis in Novel Magnetic Materials, 1997, Springer, ISBN 0792346041.

[D] Brokate, M.; Sprekels, J., Hysteresis and Phase Transitions, 1996, Springer, ISBN 0387947639.

[E] Rosanov, N., Spatial Hysteresis and Optical Patterns, 2003, Springer, ISBN 3540427937.

[F] Bowden, C., Ciftan, M., Robl, H. (eds.), Optical Bistability, 1981, Plenum, ISBN 0306407221.

[G] Harrison, R., Uppal, J. (eds.), Nonlinear Dynamics and Spatial Complexity in Optical Systems, 1993, Scottish Universities Summer School in Physis & Institute of Physics Publishing, ISBN 07503-02577.

[H] Franz, W., Hysteresis Effects in Economic Models, 1990, Physica-Verlag HD, ISBN 3790804827.

[I] Setterfield, M., Rapid Growth and Relative Decline: Modelling Macroeconomic Dynamics With Hysteresis, 1997, Palgrave Macmillan, ISBN 0333637364.

[J] Graafland, J., Persistent Unemployment, Wages and Hysteresis, 1990, Erasmus University Rotterdam, ISBN N/A.

[K] Jones, S., The Persistence of Unemployment: Hysteresis in Canadian Labour Markets, 1995, Mcgill Queens University Press, ISBN 0773513078.

[L] Krasnosel'skii, M.; Pokrovskii, A., Systems with Hysteresis, 1989, Springer-Verlag, ISBN 3540155430.

[M] lkhouane, F.; Rodellar, J., Systems with Hysteresis: Analysis, Identification and Control Using the Bouc-Wen Model, 2007, Wiley-lnterscience, ISBN 0470032367.

[N] Chua, L., "Memristor—The Missing Circuit Element," IEEE Transactions on Circuit Theory, Vol. CT-18, September 1971, pp.507-519, available at http://www.lane.ufpa.br/rodrigo/chua/Memristor_chua_article.pdf (visited 07/18/11).

[O] Adee, S., The Mysterious Memristor, IEEE Spectrum, May 2008, available at http://spectrum.ieee.org/semiconductors/design/the-mysterious-memristor (visited 07/18/11).

[P] Walker, J., "Memristors and the Future," May 11, 2010, available at http://www.nobeliefs.com/memristor.htm (visited 07/18/11).

[Q] Zeeman, E., Catastrophe Theory—Selected Papers 1972-1977, Addison-Wesley, 1977, ISBN 0201090147.

[R] Visintin, A (ed.), Models of Hysteresis, Longman Scientific & Technical, Harlow, England, 1993.

[S] Mayergoyz, I., Mathematical Models of Hysteresis, 1990, Springer-Verlag, ISBN 0387973524.

[T] Mortell, M.; O'Malley, R.; Pokrovski, A.; Sobolev, V., Singular Perturbations and Hysteresis, 2005, SIAM: Society for Industrial and Applied Mathematics, ISBN 0898715970.

[U] Visintin, A., Differential Models of Hysteresis, 1994, Springer-Verlag, ISBN 3540547932.

[V] Takacs, J., Mathematics of Hysteretic Phenomena: The T(x) Model for the Description of Hysteresis, 2003, Wiley-VCH, ISBN 3527404015.

[W] Sunny, M., Kapania, R., Moffitt, R., "A Modified Fractional Calculus Approach to Model Hysteresis," J. Appl. Mech., May 2010, Volume 77, Issue 3.

[X] Darwish, M., El-Bary, A., "Existence of Fractional Integral Equation with Hysteresis," Applied Mathematics and Computation, May 2006, Volume 176, Issue 2.

[Y] Ozdemir, N., Iskender, B., "Fractional Order Control of Fractional Diffusion Systems Subject to Input Hysteresis," J. Comput. *Nonlinear Dynam.*, April 2010, Volume 5, Issue 2.

I claim:

1. A computer-implemented method for synthesis of a hysteresis function of a plurality of inputs, the method comprising:

receiving a plurality of input signals;

processing the plurality of input signals with at least a parameterized multivariable nonlinearity, the parameterized multivariable nonlinearity serving as a parameterized hysteron, to produce at least one output signal; and processing the plurality of input signals with at least one computing device, the at least one computing device comprising a controller function and a memory, and producing at least one control signal responsive to at least one of the plurality of input signals, the at least one control signal for controlling the parameterized hysteron, wherein the at least one control signal is used to control the parameterized hysteron so as to create a hysteretic response to at least one of the plurality of input signals.

2. The method of claim 1 wherein the control signal comprises a single control signal.

3. The method of claim 1 wherein the control signal comprises a plurality of control signals.

4. The method of claim 1 wherein the controller function is responsive to at least one extremal value of the amplitude of at least one of the plurality of input signals.

5. The method of claim 1 wherein the controller function is responsive to at least an integration of the amplitude of at least one of the plurality of input signals.

6. The method of claim 1 wherein the controller function is responsive to at least one time-derivative of the amplitude of at least one of the plurality of input signals.

7. The method of claim 1 wherein the controller function is responsive to the sign of the time derivative of at least one of the plurality of input signals but independent of the rate of change of at least one of the plurality of input signals.

8. The method of claim 1 wherein the controller function is responsive to the sign of the time derivative of at least one of the plurality of input signals and responsive to the rate of change of at least one of the plurality of input signals.

9. The method of claim 1 wherein the controller function is responsive to at least one extremal value of the phase of at least one of the plurality of input signals.

10. The method of claim 1 wherein the controller function is responsive to at least an integration of the phase of at least one of the plurality of input signals.

11. The method of claim 1 wherein the controller function is responsive to at least one time-derivative of the phase of at least one of the plurality of input signals.

12. The method of claim 1 wherein the controller function is responsive to at least one extremal value of a quantity responsive to the signal spectrum of at least one of the plurality of input signals.

13. The method of claim 1 wherein the controller function is responsive to at least an integration of a quantity responsive to the signal spectrum of at least one of the plurality of input signals.

14. The method of claim 1 wherein the controller function comprises fractional-order dynamics.

15. The method of claim 1 wherein the controller function is responsive to at least one time-derivative of a quantity responsive to the signal spectrum of at least one of the plurality of input signals.

16. The method of claim 1 wherein the parameterized hysteron comprises a parameterized all-pass filter imposing phase modulation on at least one input signal, the phase modulation responsive to the at least one control signal.

17. The method of claim 16 wherein the phase modulation if further responsive to spectral content of the at least one input signal.

18. The method of claim 1 wherein the parameterized hysteron comprises a parameterized filter imposing at least amplitude modulation on at least one input signal, the amplitude modulation if further responsive to spectral content of the at least one input signal.

* * * * *